(12) United States Patent
Thompson

(10) Patent No.: US 7,195,267 B1
(45) Date of Patent: Mar. 27, 2007

(54) TRAILER HITCH VIDEO ALIGNMENT SYSTEM

(76) Inventor: Curtis C. Thompson, 8405 Timothy La., Oklahoma City, OK (US) 73135

( * ) Notice: Subject to any disclaimer, the term of this patent is extended or adjusted under 35 U.S.C. 154(b) by 0 days.

(21) Appl. No.: 10/886,216

(22) Filed: Jul. 7, 2004

(51) Int. Cl.
B60D 1/36 (2006.01)
B60D 1/58 (2006.01)

(52) U.S. Cl. ............... 280/477; 340/426; 340/901; 358/224

(58) Field of Classification Search ......... 280/477; 340/426, 901; 358/224
See application file for complete search history.

(56) References Cited

U.S. PATENT DOCUMENTS

| | | |
|---|---|---|
| 3,924,257 A | 12/1975 | Roberts |
| 3,938,122 A | 2/1976 | Mangus |
| 4,054,302 A | 10/1977 | Campbell |
| 4,187,494 A | 2/1980 | Jessee |
| 4,952,908 A | 8/1990 | Sanner |
| 5,108,123 A | 4/1992 | Rubenzik |
| 5,179,446 A * | 1/1993 | Hong .................. 348/333.07 |

(Continued)

OTHER PUBLICATIONS

Advertisement, Hindsight Backup Monitor System, byVizuaLogic, 1493 Bentley Drive, Corona CA 92879, www.vizualogic.com.

Primary Examiner—Lesley D. Morris
Assistant Examiner—Marlon Arce-Diaz
(74) Attorney, Agent, or Firm—James F. Harvey, III; Doerner Saunders Daniel & Anderson, LLP

(57) ABSTRACT

The invention provides an apparatus for alignment of a trailer hitch with a trailer tongue, so that the operator does not leave the cab of the towing vehicle in order to facilitate the alignment. The system may comprise a control assembly and a remote assembly, the control assembly further comprising a display unit and a receiver, and the remote assembly further comprising a video camera, a transmitter, and a light. The remote system may be removably attached to the rear end of the towing vehicle and positioned to provide a vertical view of the hitch area, and the control assembly may be removably attached to a surface within the cab. The transmitter provides a wireless video signal of the hitch area for reception by the receiver and subsequent display on the display unit. Power for the system may be provided by batteries, and in the case of the remote assembly, a plug adaptable for attachment to the standard cable socket for trailer braking and lights. The system allows the operator to see the hitch area from the operator's seat during the attachment process so that the operator may properly align the towing vehicle with the tow object without requiring a second person or the operator having to get out and check the alignment. The system thus promotes safety and reduces the probability of damage to the towing vehicle by the tongue of the trailer. An illumination means such as a light may be provided with the remote assembly for use during nighttime and inclement weather.

18 Claims, 2 Drawing Sheets

U.S. PATENT DOCUMENTS

| | | |
|---|---|---|
| 5,191,328 A | 3/1993 | Nelson |
| 5,558,352 A | 9/1996 | Mills |
| 5,574,443 A * | 11/1996 | Hsieh .......................... 340/901 |
| 5,646,614 A * | 7/1997 | Abersfelder et al. ..... 340/932.2 |
| 5,650,764 A | 7/1997 | McCullough |
| 5,821,852 A | 10/1998 | Fairchild |
| 5,861,814 A | 1/1999 | Clayton |
| 5,951,035 A | 9/1999 | Phillips, Jr. et al. |
| 6,002,326 A * | 12/1999 | Turner ..................... 340/426.1 |
| 6,049,288 A * | 4/2000 | Kawasaki ................ 340/815.4 |
| 6,100,795 A | 8/2000 | Otterbacher et al. |
| 6,175,300 B1 * | 1/2001 | Kendrick ................... 340/436 |
| 6,178,650 B1 | 1/2001 | Thibodeaux |
| 6,222,457 B1 | 4/2001 | Mills et al. |
| 6,259,357 B1 | 7/2001 | Heider |
| 6,357,126 B1 | 3/2002 | Gillen, Jr. |
| 6,480,104 B1 | 11/2002 | Wall et al. |
| 6,498,640 B1 * | 12/2002 | Ziger .......................... 355/53 |
| 6,542,182 B1 * | 4/2003 | Chutorash ................... 348/148 |
| 6,550,949 B1 * | 4/2003 | Bauer et al. ................. 362/545 |
| 6,700,692 B2 | 3/2004 | Tonar et al. |
| 6,822,563 B2 * | 11/2004 | Bos et al. ................... 340/461 |
| 2004/0094934 A1 * | 5/2004 | Teague ....................... 280/477 |

* cited by examiner

TRAILER HITCH VIDEO ALIGNMENT SYSTEM

BACKGROUND OF THE INVENTION

The present invention relates generally to mechanisms for remote realtime viewing of an area of interest. More specifically, it relates to the use of an electronic system to aid in the alignment of a trailer hitch of a tow vehicle with the tongue of a trailer, or tow object. Still more specifically, the present invention relates to a video system to present an analog video image on a screen, where the realtime image allows a vehicle operator to view an area of interest that may include the tow vehicle hitch.

Use of a removable trailer with a vehicle involves the operations of attaching and disconnecting a tongue of the tow object with a hitch of the towing vehicle. Normally, the hitch alignment operation consists of elevating the tongue to a position higher than that of the trailer hitch, positioning the vehicle so that the hitch is positioned under the tongue, and lowering the tongue of the tow object onto the hitch in order to engage the hitch and tongue. This operation is made more difficult by the fact that the trailer hitch is usually out of view from the vehicle operator who is sitting in the cab of the vehicle, since the trailer hitch is commonly located on a bumper of the tow vehicle which is out of eye sight. Some operators, and in particular older operators, may find this operation difficult and even painful since they must rearwardly twist their necks or bodies when trying to see the tow object while manipulating the steering apparatus of the towing vehicle.

Alignment of the hitch and tongue is generally accomplished according to two methods. One method is to have a second person, or "spotter", in place on the ground in the vicinity of the tongue of the trailer, so that he can inform the operator of the towing vehicle of the relationship of the trailer hitch to the tongue as the towing vehicle operator backs the towing vehicle into position. If ambient light is low, for reasons of evening or inclement weather, then the process is even more difficult and sometimes dangerous if a spotter is involved, since the operator may have difficulty seeing the spotter. The second method is for the towing vehicle operator to repeatedly back the towing vehicle and then exit the towing vehicle to check the alignment of the trailer hitch and the tongue.

There are a number of problems attendant with the first method. When using the first method with a spotter, both the spotter and the operator must coordinate activities so that the operator does not accidentally back the vehicle into or over the spotter. There must be close coordination between the two individuals in order to avoid injury to either personnel or equipment. Often the operator may back the vehicle too rapidly or misjudge the orientation of the hitch and tongue, despite direction from the spotter, and allow the tongue to come into contact with the rear of the towing vehicle. This may result in damage to the tow vehicle, the trailer, or both if the speed is high enough. The rear of the towing vehicle can be damaged by the tongue if the tongue is set too high, or the tow object can be damaged or knocked off of any supporting devices if it is hit by the towing vehicle. Either of these events can also injure the spotter if the spotter gets accidentally pinned between the vehicle and trailer or the trailer falls on the spotter. Damage to either the towing vehicle or the trailer is almost inevitable over a period of time.

The second method also has its problems as well. In addition to the possibility of damage to the rear of the towing vehicle, this method may be tiring, cumbersome, and time consuming for the towing vehicle operator to repeatedly exit the cab of the towing vehicle to check alignment of the tongue and hitch and then reenter the cab. Furthermore, the vehicle could inadvertently slip out of gear and move while the operator is out of the cab, thus creating a hazardous condition for both the operator and the equipment. If the operator has physical impairments or is of advanced age, then the repeated entry-exit process can be physically tiring.

Another consideration in the alignment process is the fact that many people today may own multiple vehicles, such as a sport utility vehicle (SUV), a pickup truck, and a motor home. Each type of vehicle offers different operating characteristics and must be accommodated by the towing vehicle operator when each vehicle is aligned with the same trailer.

Many electronically configured systems and methods are found in the prior art that address the problem of hitching a tow object with a towing vehicle. Otterbacher et al. (U.S. Pat. No. 6,100,795) discloses a device for locating the position of a hitch on a towing vehicle relative to the tongue of the tow object, where the device comprises a control mountable to a visor of the towing vehicle, a receiver unit attachable to the bumper of the towing vehicle and in communication with the control unit, a transmitter unit removably attachable to a trailer hitch to transmit a locating signal that is detectable by the receiver unit, and a storage case. Electronic circuitry within the control unit determines the position of the transmitter unit with relation to the receiver unit by means of the reception of the coded locating signal sent by the receiver unit. The control unit graphically displays left and right indicators to direct the towing vehicle operator to turn left or right while backing toward the tow object. It also includes an audible warning and stop indicator light for signaling when the ball hitch of the towing vehicle is positioned below the tongue of the tow object. The control unit also includes a display screen that graphically indicates the position of the towing vehicle with respect to the tow object. However, the unit does not show the nature of other objects that may be in the vicinity of the hitch area surrounding the hitch and tongue. The transmitter unit must be precisely placed, and if it inadvertently becomes dislodged, then the operator may follow incorrect directions from the control unit and damage the vehicle or the trailer. Finally, such devices may be susceptible to radio interference from external sources under some circumstances; such interference may not be easily detectable by the control unit or obvious to the operator.

Wall et al. (U.S. Pat. No. 6,480,104) discloses an arrangement of transducers positioned on the rear of a towing vehicle and on the front end (tongue side) of a trailer. A towing vehicle transceiver and a trailer transceiver are mounted on the rear of the vehicle and the front of the trailer, respectively, to sense the transducers located on the towing vehicle or trailer. The transceivers communicate with the transducers by ultrasonic signals. A control unit is located in the cab of the vehicle and communicates with the two transceivers by RF communications. The control unit receives signals from the two transceivers and, after a series of transformations that convert the signals into relative positions, displays the results on a graphical display in the cab of the vehicle. However, this disclosure assumes a permanent modification of both the vehicle and the trailer in order to install the transceivers and transducers in fixed locations, and thus portability is not a consideration; the power source is also permanently wired to the vehicle. If multiple vehicles are used for towing, then each vehicle must be similarly wired. Furthermore, the display is a graphical display rather than a video display.

Thibodeaux (U.S. Pat. No. 6,178,650) discloses a trailer hitch positioning system providing both a visual and audible notification to the vehicle operator. It comprises a pinpoint light source assembly, a light beam sensing array assembly, and a display unit. The pinpoint light source assembly is located on the trailer and is aligned with the tongue. It directs a beam to the sensing array mounted on the rear of the vehicle to activate sensors located within the array. Depending upon which sensor is activated, an indicator energized within the display unit so that the operator can determine the alignment of the tongue with relation to the ball. Communication with the display unit is made by wire rather than by wireless means, power for the unit is derived from a power adaptor connected to the cigarette lighter in the vehicle cab. The system is removable from both the vehicle and the trailer and thus portable. However, it does not provide a visual display of the hitch area, and it does contain an independent power supply.

The HindSight™ BackUp Monitor System (pat. pend.) by VizuaLogic® (TMI Products, Inc., 1493 Bentley Drive, Corona, Calif. 92879), currently marketed by a number of aftermarket retailers, comprises a video system for wide-angled viewing of the area behind a vehicle. The system interacts with the vehicle so that, when reverse gear is selected, a bumper-mounted video camera mounted in a fixed position sends a visual view of the area behind the vehicle to a monitor housed between the rear-view mirror and driver's sun visor. The camera may be permanently flush mounted either on or under the rear bumper in order to reduce notice by passers-by and thus prevent theft of the device. However, its permanent installation obviates portability considerations and multiple systems must be purchased when more than one towing vehicle is used for towing.

As can be seen, there is a need for a trailer alignment method and system capable of easily being attached and removed from a vehicle and that can be easily and universally adaptable to a wide variety of vehicle and trailer configurations. It should be simple to use, easily installed and removed without requiring permanent alteration of either the vehicle or trailer. The trailer alignment system should be usable under varying lighting conditions. It should enable a single individual to successfully align a trailer hitch with a trailer tongue without the individual leaving the cab of the truck for alignment checks. Finally, it should provide a visual, and not a graphical, depiction of the hitch alignment area so that foreign objects may be easily detected, identified, and taken into account when backing the towing vehicle.

SUMMARY OF THE INVENTION

In one aspect of the present invention, a trailer alignment system is provided for use on a towing vehicle with a hitch, a rear end, and a cab. The system may comprise a control assembly and a remote assembly. The control assembly may further comprise a display unit receiving a video signal for presentation thereon; a receiver receiving the video signal for presentation to the display unit; a first mounting means for removable attachment to a surface in the cab; and a first power source providing power for the receiver and display unit. The remote assembly may comprise a camera capturing a view as a video signal; a transmitter receiving the video signal from the camera and sending the video signal by radio wave to the receiver; a second power source providing power for the transmitter and the camera; and a second means for removable attachment of the remote assembly to the rear end.

In another aspect of the present invention, a trailer alignment system is provided for use on a towing vehicle having a cab and a rear end. The system may comprise a video camera providing a video signal; a transmitter using an X10 communications protocol for the transmission of the video signal; a first mount for removable attachment of the video camera and transmitter to the rear end, the mount comprising a suction cup connected to the video camera and transmitter by an articulated bracket, so that the suction cup is attached to the rear end and the video camera positioned by the bracket; a first power source comprising a plug adapted to be received by a cable receptacle on the rear of the towing vehicle; a display; a receiver using the X10 communications protocol for reception of the video signal, the receiver sending the video signal for presentation on the display; a second mount for removable attachment of the display and the receiver to a surface within the cab; and a second power source providing power to the receiver and the display.

In another aspect of the present invention, a method is provided for aligning a hitch attached to a rear end of a towing vehicle with a tongue attached to a trailer so as to facilitate engagement of hitch and tongue. The method comprises the steps of providing a video camera having a transmitter, the camera and transmitter configured for removable attachment the rear end; positioning the video camera to provide a generally vertical view of a hitch area, within which the hitch and tongue are engaged; providing the video camera with a power source provided by the attachment of a suitably configured plug associated with the video camera that is inserted into a cable receptacle on the rear end; providing a display for removable attachment upon a surface within a cab of the towing vehicle, wherein the video monitor may be attached in such a manner to allow a operator of the vehicle to simultaneously view a forward area of the vehicle and the hitch area without turning; sending a video signal representing the hitch area and captured by the video camera to the display; backing the vehicle so as to position the hitch under the tongue according to the vertical view of the hitch area as seen on the display; and engaging the hitch and tongue.

These and other features, aspects and advantages of the present invention will become better understood with reference to the following drawings, description and claims.

DETAILED DESCRIPTION OF THE INVENTION

Figure 1:
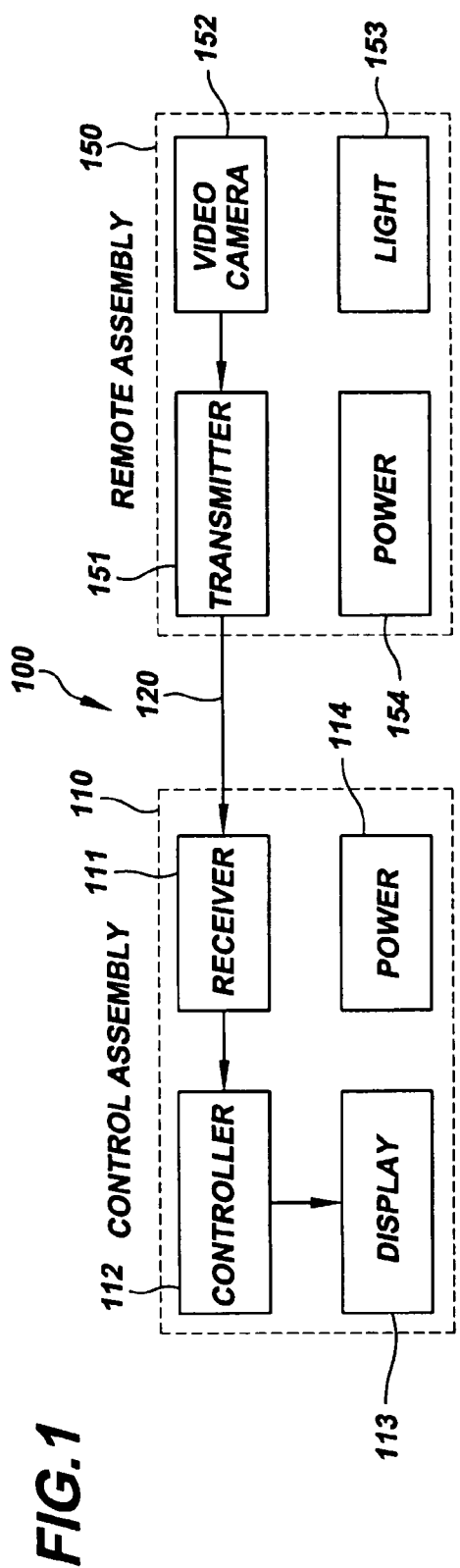
FIG. 1 shows a schematic block diagram of the inventive system, according to an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention, commercially designated as the Hitch Aid System, provides a system and method that assists the operator of a vehicle having a trailer hitch attached to the rear of the vehicle to easily align the trailer hitch to the tongue of a trailer without damaging the vehicle by the tongue or requiring the operator to exit the cab of the vehicle for alignment operations between the hitch and tongue. It may allow the operator to ascertain whether or not any assisting personnel are in the vicinity of the hitch area so that injury does not result to the assisting personnel. It may also allow the operator to determine if there are any other foreign objects in the immediate vicinity of the hitch and tongue, such foreign objects being such things as brush, stumps, poles, animals, tarpaulins, and the like. It also may have provisions for illuminating the hitch area during the alignment operation so that alignment may be easily accomplished during low light conditions and inclement weather. The inventive system may be either battery operated or powered through the trailer electrical connection and/or the cigarette lighter in the cab of the vehicle. It may also be portable so that it can be easily moved to any vehicle. Finally, it may be easily aligned to provide a view not only of the hitch area but also of any chosen rearward view.

Similar hitch alignment systems found in the prior art that enable a vehicle operator to align a trailer hitch with a trailer tongue without leaving the vehicle cab do not incorporate all aspects of the present invention into the same product. Some such systems require permanent attachment to the towing vehicle, the trailer, or both, so that they can maintain a fixed and known alignment with the vehicle or the trailer, and portability is neither available or desirable. Also, they generally derive their power from the outlets provided in the cab of the vehicle. Furthermore, such systems are graphical in nature, rather than visual; in other words, they generate graphical indications representative of the actual alignment process rather than visually displaying the realtime images of the hitch alignment area. Such systems thus do not require illumination of the hitch alignment area since they rely on electronic means for sensing the alignment of the vehicle and trailer. Other systems use expensive low light cameras that do not require lighting. Finally, such systems do not have a means for reliably detecting the intrusion of human body parts, brush, protuberances, and other foreign matter into the hitch alignment area when these items might interfere with the alignment process. The inventive system provided herein overcomes all of these problems.

The inventive system may allow the vehicle operator to see the hitch area from the operator's seat in the cab during the alignment and attachment process. The ability to see the hitch area may allow the operator to properly align the trailer hitch on the towing vehicle with the tongue on the tow object, or trailer, without requiring a second person as a spotter, or the operator having to get out and check the alignment. This may eliminate a possible safety risk associated with a person having to watch the alignment process from behind a moving vehicle. It also reduces the possibility of injury to the vehicle operator, where the operator exits the vehicle to check the alignment and forgets to first take the vehicle out of gear. The inventive system may comprise the following components: (1) a control unit for removable attachment to a stable platform within the cab of the vehicle, such as the visor, and comprising a flat screen display and a receiver for wireless communication; (2) a remote unit comprising a camera and a transmitter for wireless communication, the remote unit configured for removably attachment to any portion of the rear of the vehicle; and (3) a light also configured for removable attachment to the rear of the vehicle to illuminate the hitching area, so that the Hitch Aid System may be used at night, during inclement weather, or at other times when ambient light is low. The control unit presents a picture on flat screen display of the area of the hitch, so that the hitch may be guided by a vehicle operator to approach the tongue for connection with the hitch. The control unit and the remote unit may be separately powered by any convenient combination of batteries, cigarette lighter plugs, or remote hitch plugs, as needed. The inventive system may be constructed from off-the-shelf parts that are readily and commercially available.

Referring now to FIG. 1, in which is shown a general schematic diagram of an embodiment of the invention, the trailer hitch video alignment system 100 may comprise a control assembly 110 and a remote assembly 150. The control assembly 110 may be configured for attachment within the cab of a towing vehicle within the field of view of an operator. Its functional elements may comprise a receiver 111 to receive a video signal 120, a controller 112 to convert the video signal into a form for display, a display 113 to present the converted video signal on a light emitting medium for viewing by an operator, and a power source 114 to provide power to drive the various system components. The remote assembly 150 may be configured for removable attachment to the rear portion of the towing vehicle and may comprise a video camera 152 to capture a realtime image and generate a video signal 120, a transmitter 151 to transmit the video signal 120, an optional illumination source in the form of a light 153 to illuminate the area to be captured, and a power source 154 to provide power to drive the various remote assembly components. The function of the remote assembly 150 may be to capture a video representation of an area in the vicinity of a trailer hitch, and the function of the control assembly 110 may be to present that area to the operator of the vehicle on the display 113.

Figure 2:
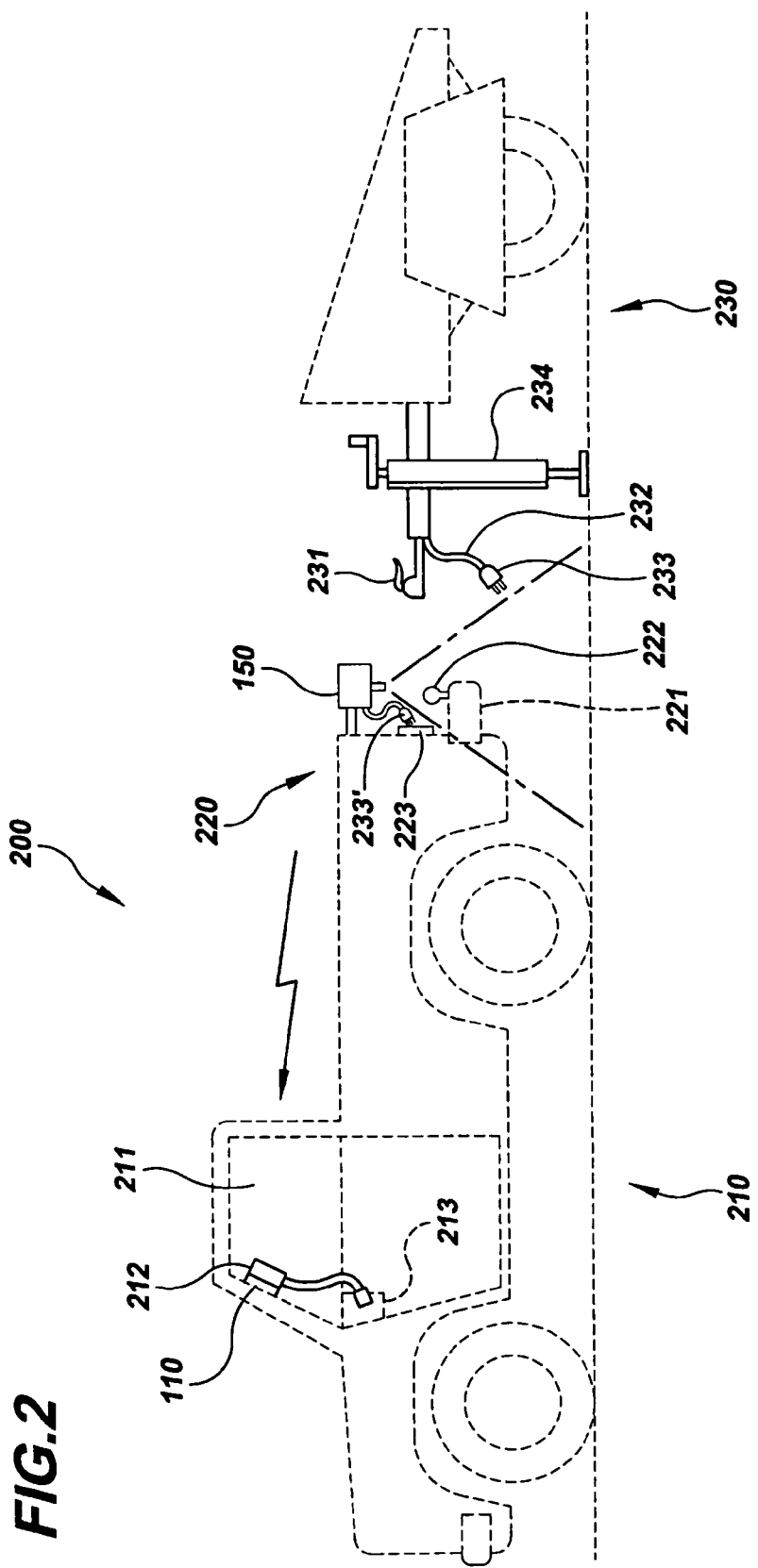
FIG. 2 shows a side view of a towing vehicle and trailer with the invention positioned thereon, according to an embodiment of the invention.

Referring now to FIG. 2, an embodiment of the invention 200 is shown as it may be used in aligning a trailer with a towing vehicle 210. The towing vehicle may have a cab 211 to protectively house the operator of the towing vehicle 210 during driving operations. The cab 211 may provide numerous surfaces such as a sun visor 212, dashboard 213, center console (not shown), and the like, upon which the control assembly 110 may be removably attached and positioned to be within convenient viewing of the operator. At the rear 220 of towing vehicle 210 may be a bumper 221 upon which a trailer hitch 222 may be mounted; the trailer hitch 222 may be in the form of a ball mounted on a pedestal, as shown, although other trailer hitch 222 arrangements may be used without departing from the scope of the invention. For example, a gooseneck towing arrangement mounted in the bed of the truck or a plate for receiving the kingpin of a tractor trailer rig may also be within the scope of the invention.

A trailer 230 that is intended to be towed by the towing vehicle 210 may have a tongue 231 permanently attached to the trailer 230, where the tongue 231 is configured for removable and pivotable engagement with the trailer hitch 222. The trailer 230 may also have a cable harness 232 containing wiring for the trailer taillights (not shown), braking system (not shown), interior lighting (not shown), and other electrical systems within or on the trailer. The cable harness 232 may terminate in a cable plug 233 which may be received by a cable receptacle 223 located at an arbitrary place along or within the bumper 221. The cable receptacle 223 may be permanently tied in to the electrical system of the towing vehicle 210 to provide electrical power and signaling to various systems in the trailer 230. The trailer 230 may also have a jack 234 for elevating the tongue 231 to a sufficient height so that the towing vehicle 210 may be maneuvered to place the trailer hitch 222 immediately under the tongue 231; when so positioned, the jack 234 may be employed to lower the tongue 231 onto the trailer hitch 222 so that they may be engaged for towing operations.

Figure 3:
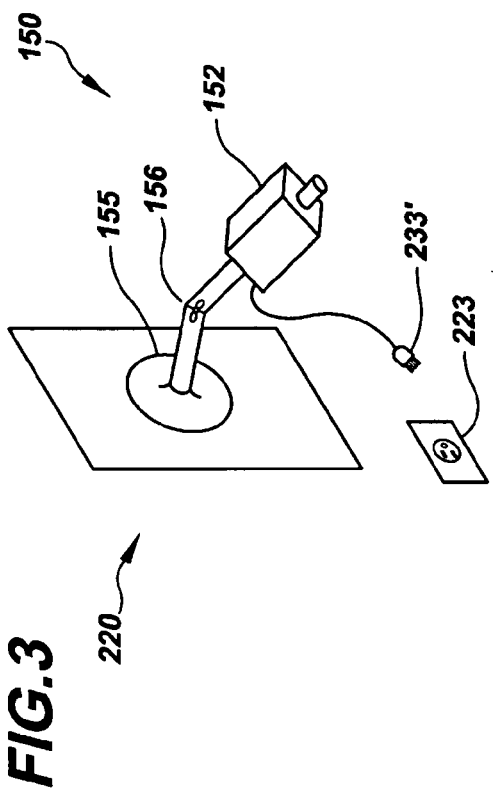
FIG. 3 shows a perspective view of the remote assembly and its means for attachment with the rear of a vehicle, according to an embodiment of the invention.

The remote assembly 150 may be positioned at an arbitrary location on the rear 220 of the towing vehicle 210 and adjusted to send the desired view to the control unit 212 in the cab 211 of the towing vehicle 210. In particular, it may be advantageously positioned to present an overhead view of the hitch area immediately surrounding the hitch 222. The remote assembly 150 may be housed within a single case or it may be configured as separate, unitary components without departing from the scope of the invention. The video camera and transmitter may also be separate components within the case or may themselves be integrated into a single component incorporating the functions of a camera and transmitter. Referring to FIG. 3, the remote assembly 150 may be configured for mounting at any convenient position along the rear 220 of the towing vehicle 210 and aligned to capture an image of the hitch area. It may be attached to the rear 220 of the towing vehicle 210 by means that preferably do not damage the painted surface of the vehicle 210, such as by suction cups 155, hook and eye attachments, straps, tapes, and similar means without departing from the scope of the invention. Magnetic attachment means may interfere with the video signal, and while they may be used, do not offer the advantages that other attachments means may offer. The remote system with its attachment means may also be adapted to allow it to be mounted to present different views of the hitch area, such as a vertical view giving an overhead view of the hitch area or a side view giving more of a perspective presentation of the hitch area. A bracket 156 may be used to provide adjustability and aiming of the camera 152. The remote system may also be mounted so as to show a rear view of the area behind the vehicle to promote safe backing actions.

The video camera 152 may be any video capture device that is small, compact, and light. The requirement for light weight may promote the use of suction cups as the attachment means for the remote assembly 150. A low light camera device may be too large to provide the necessary portability and low weight required by the inventive application, although it may be used in the inventive apparatus if the attachment means is sufficient to support the weight. Therefore, it has been found that a small, low cost camera with an optional light source may provide the necessary functionality of the invention. The video camera 152 may be integrated with a transmitter 151 having an adjustable antenna for providing a stronger video signal to the control assembly. The video camera 152 may be of a type having a color CMOS image sensor with a resolution of 330 TV lines, but other such video cameras may be used without departing from the scope of the invention.

The power source 154 for the remote assembly 150 may comprise any direct current power source to drive the video camera. An example of such a power source 154 may be standard batteries of suitable strength to provide power the camera 152, transmitter 151, and optionally the light 153. Alternatively, a plug 233', which may have the same characteristics as plug 233, may be used as the power source 154. Using this arrangement, plug 233' may be inserted into the cable receptacle 223 at the rear 220 of towing vehicle 210 in order to use the electrical system provided by towing vehicle 210 to power the various components of the remote assembly 150. The light 153 may also receive electrical power from this source, or it may optionally have its own plug 233" that may be used in cable receptacle 223 or inserted into a Y-connector that may permit two different plugs 233' and 233" to be used with the same cable receptacle 223. Cable receptacle 223 may be any one of several standard cable receivers commonly found in the prior art associated with vehicle towing packages. In still another embodiment of the power source 154, a plug adaptor for remote connection to a standard cigarette lighter receptacle in the cab 211 of the towing vehicle 210 may also be provided, with the plug adaptor connected to the remote assembly 150 through a long electrical wire sufficient to extend from the cab 211 to the rear 220 of towing vehicle 210. These plug adaptors provide a standard 12 v. DC power source to be provided from the battery system of the vehicle through a connection in the cab 211.

The means for sending the video signal 120 between the transmitter 151 and the receiver 111 may be configured for any wireless protocol and radio frequency that is appropriate and useful for short range video transmission. For example, the video signal 120 may be transmitted and received at about 2.4 Ghz according to the Federal Communications Commission Regulations, Part 15. The transmitter and receiver may be configured according to a commercially available X-10 protocol that provides up to 700 feet line of sight communications between the transmitter and receiver (although a 50 foot range would be sufficient for the invention); this protocol and configuration is currently in common use within residential environments for home applications such as lighting control and security systems. X10 is a communications protocol for remote control of electrical devices. It is designed for communications between X10 transmitters and X10 receivers that communicate on standard household wiring. As such, standard, commercially-available X-10 transmitters and receivers generally plug into standard 110 v. electrical outlets and electrical boxes, and must therefore be adapted for direct current voltages commonly found in vehicle battery systems through the use of transformer or an adapter. The X-10 configuration has been found not to interfere with mobile cellular telephones or cardiac pacemakers commonly found in the general public. Note that "X-10" is a U.S. registered trademark of X-10 Limited Corporation, Bermuda, 1103-4 Hilder Center, 2 Sung Ping Street Hung Horn, Kowloon, Hong Kong.

An optional light 153 may be provided either as an integrated component of the remote assembly, when the remote assembly is integrated into a single case, or as a separate component from the camera 152 and the transmitter 151. The light 153 may have its own power source according to the methods previously described or may derive its power from that of the remote assembly 150. If the remote assembly 150 is powered by battery means, then the light 153 may also be powered by its own battery means, by a suitably configured plug for use with a standard cable receptacle 223, or by an electrical circuit connected to the power source 154 of the remote assembly 150.

The control assembly 110 may be housed within a single case or it may be configured as separate, unitary components without departing from the scope of the invention. An optional controller 112 may be provided to add other useful features to the control assembly 110, such as a power usage meter, indicator lights, or superimposition of grid lines or ruler lines on the video display. Such a controller 112 may contain microprocessors for implementation of these features. The display 113 may be sized so that it may be easily mounted on a standard sun visor 212 or a dashboard 213 within the cab 211 of the towing vehicle 210. For example, an LCD display such as those manufactured by Tecvox, Inc., In one exemplary embodiment, a flat panel liquid crystal diode TFT color display unit may be used advantageously to display the video signal. This unit measures approximately 5"×7" and has sufficient display resolution of 960×234 pixels to show the view without undue strain on the eyes. This and similar units may be used as the display unit.

The power source 114 for control unit 110 may be provided by battery storage physically contained within the control unit 110 itself. In another embodiment, the power source 114 may be a plug suitably configured for insertion into a standard cigarette lighter receptacle commonly found in the cab 211 of most towing vehicles 210.

The hitch aid system, as described above, may be stored for portable use in a small bag sized to contain all the components of the system. For operation, the control unit 110 may be removed and place in a suitable position within the cab 211. The display 113 may be temporarily attached at a position to enable the operator of the towing vehicle 210 to view the display 113 while facing forward in a normal driving position. Suitable locations for the display 113 may be the sun visor 212 or the dashboard 213 within the cab 211. The control unit 110 may then be powered on by either turning on a switch to allow the battery to activate the components in the control unit 110 or by plugging a plug associated with the control unit 110 into the cigarette lighter receptacle. The remote unit 150 may be installed in a suitable position on the rear 220 of the towing vehicle 210 by engaging the attachment means to a suitable area on the rear 220 and aiming the camera 152 at the area desired to be viewed, normally a vertical view of the hitch area. The remote unit 150 may then be powered by either turning on a switch to allow a battery to activate the components in the remote unit 150 or by plugging a plug associated with the remote unit 150 into the cable receptacle 223. The operator would then ensure that the tongue 231 of the trailer 230 is elevated to a height greater than that of the trailer hitch 222, by extending the jack 234. The operator may then return to the cab 211 and back the vehicle 210 while facing forward and observing the hitch area in the display 113. In this manner, the hitch 222 and the tongue 231 may be aligned without requiring the operator to leave the cab 211.

While the specific embodiment of the device herein described has been for a towing vehicle such as a truck and a tow object such as a trailer, it should be understood that the inventive system and method may be employed in numerous situations requiring alignment of a vehicle with a tow object. Other such vehicles upon which the invention may be used may be such things as farm tractors, mobile homes, and passenger cars. Other tow objects upon which the invention may be practices may be such items as stock trailers, horse trailers, travel trailers, farm implements, and the like. It may also be used on towing vehicles, or tugs, commonly in use on aircraft flight lines in military and commercial aviation settings.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

It should be understood, of course, that the foregoing relates to preferred embodiments of the invention and that modifications may be made without departing from the spirit and scope of the invention as set forth in the following claims. As will be appreciated by one of skill in the art, embodiments of the present invention may be provided as methods, systems, or computer program products. For example, the optional controller of the present invention may take the form of an entirely hardware embodiment, an entirely software embodiment, or an embodiment combining software and hardware aspects.

From the foregoing, it will be understood by persons skilled in the art that an innovative trailer hitch video alignment system has been provided. The invention is relatively simple and easy to manufacture, yet affords a variety of uses. While the description contains many specifics, these should not be construed as limitations on the scope of the invention, but rather as an exemplification of the preferred embodiments thereof. The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

While the invention has been illustrated by disclosing a number of embodiments herein and described in detail in the drawings and foregoing description, the same is to be considered as illustrative and not restrictive in character. It should be understood that only the preferred embodiments have been shown and described and that all changes and modifications that come within the spirit of the invention are desired to be protected. With respect to the above description, it should be further understood that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A trailer alignment system for use on a towing vehicle with a hitch, a rear end, and a cab, the system comprising:
    a control assembly further comprising
        a display unit receiving a video signal for presentation thereon, wherein the video signal is transmitted using an X10 communications protocol;
        a receiver receiving the video signal for presentation to the display unit;
        a first mounting means for removable attachment to a surface in the cab; and
        a first power source providing power for the receiver and display unit;
    and a remote assembly comprising
        a camera capturing a view as a video signal;
        a transmitter receiving the video signal from the camera and sending the video signal by radio wave to the receiver;
        second power source providing power for the transmitter and the camera; and
        second means for removable attachment of the remote assembly to the rear end.

2. The system described in claim 1, wherein the remote assembly further comprises a light powered by a third power source, the light having a third means for removable attachment to the rear end, the light positioned to illuminate the view.

3. The system described in claim 1, wherein the second power source is the same as the first power source.

4. The system described in claim 1, wherein the second power source is the same as the third power source.

5. The system described in claim 1, wherein the first, the second, and the third power sources are the same power source.

6. The system described in claim 1, wherein the first power source is selected from a group consisting of a plug for use in a cigarette lighter receptacle in the cab and a battery.

7. The system described in claim 1, wherein the surface is selected from the group consisting of a surface of a sun visor and a surface of a dashboard.

8. The system described in claim 1, wherein the second power source is selected from the group consisting of a plug for use in a cable receptacle permanently mounted at the rear end, a plug for use in a receptacle within the cab, and a battery.

9. The system described in claim 1, wherein the second mounting means is selected from a group consisting of a magnet, a suction cup, a hook and eye attachment, tape, and a strap.

10. A trailer alignment system for use on a towing vehicle having a cab and a rear end, the system comprising
   a video camera providing a video signal;
   a transmitter using an X10 communications protocol for the transmission of the video signal;
   a first mount for removable attachment of the video camera and transmitter to the rear end, the mount comprising a suction cup connected to the video camera and transmitter by an articulated bracket, wherein the suction cup is attached to the rear end and the video camera positioned by the bracket;
   a first power source comprising a plug adapted to be received by a cable receptacle on the rear of the towing vehicle;
   a display;
   a receiver using an X10 communications protocol for reception of the video signal, the receiver sending the video signal for presentation on the display;
   a second mount for removable attachment of the display and the receiver to a surface within the cab; and
   a second power source providing power to the receiver and the display.

11. The system described in claim 10, wherein the second power source is a plug adapted to be received by a cigarette lighter receptacle within the cab.

12. The system described in claim 10, wherein the second power source is a battery mountable on the second mount.

13. The system described in claim 10, wherein the first power source is a plug adapted to be received by a cable receptacle mounted on the rear end, the cable receptacle connected to an electronic system of the vehicle.

14. The system described in claim 10, wherein the first power source is a battery mountable on the first mount.

15. The hitch aid system of claim 10, wherein the display is an LCD display.

16. The system described in claim 10, further comprising a light having a third mount for removable attachment to the rear end, the light being powered by a third power source.

17. The system described in claim 11, wherein the second power source and the third power source are the same.

18. A method of aligning a hitch attached to a rear end of a towing vehicle with a tongue attached to a trailer so as to facilitate engagement of hitch and tongue, the method comprising the steps of
   providing a video camera having a transmitter, the camera and transmitter configured for removable attachment to the rear end;
   positioning the video camera to provide a generally vertical view of a hitch area, within which the hitch and tongue are engaged;
   providing the video camera with a power source provided by the attachment of a suitably configured plug associated with the video camera that is inserted into a cable receptacle on the rear end;
   providing a display for removable attachment upon a surface within a cab of the towing vehicle, wherein the video monitor may be attached in such a manner to allow a operator of the vehicle to simultaneously view a forward area of the vehicle and the hitch area without turning;
   transmitting a video signal representing the hitch area and captured by the video camera to the display using X10 communications protocol;
   backing the vehicle so as to position the hitch under the tongue according to the vertical view of the hitch area as seen on the display; and
   engaging the hitch and tongue.

* * * * *